April 8, 1969        L. M. PALMER        3,437,907

FREQUENCY CONTROLLED INVERTERS

Filed July 28, 1967

INVENTOR.
Lawrence M. Palmer

BY

ATTY'S.

United States Patent Office 3,437,907
Patented Apr. 8, 1969

3,437,907
FREQUENCY CONTROLLED INVERTERS
Lawrence Merrill Palmer, Arcadia, Calif., assignor to Motorola, Inc., Franklin Park, Ill., a corporation of Illinois
Filed July 28, 1967, Ser. No. 656,824
Int. Cl. H02m 7/48
U.S. Cl. 321—45                                 6 Claims

ABSTRACT OF THE DISCLOSURE

A two-transformer voltage inverter circuit having a frequency control connected in effective series circuit with the base electrodes of two transistors in the inverter circuit and the base drive winding of the frequency determining transformer. The frequency control provides a voltage drop between the base drive winding and the transistors to minimize the effect of $V_{BE}$ variations on inverter frequency. This voltage drop is provided, for example, by a transistor connected therebetween or a Zener diode connected to oppose normal emitter current flow. The frequency control may also be resistor or forward biased diodes. Diodes with negative temperature coefficient may be used to compensate negative temperature coefficient of saturation flux density, Bs, of saturable core in frequency determining transformer. Control circuitry is provided for controlling the impedance across the base drive winding.

Background of the invention

This invention relates to voltage inverter circuits and particularly to those having stable and controllable frequency characteristics.

The frequency of oscillation of the well known current feedback transistorized voltage inverter has been found to be proportional to the voltage drop between the base and the emitter electrodes of the inverter transistors when such electrodes are connected across the base drive windings. This voltage is often referred to as $V_{BE}$. $V_{BE}$ is a function of both temperature and the load connected to the inverter circuit. Therefore, frequency of the inverter operation will vary both with temperature and load. It is desired that the frequency of operation of inverters in many applications be stabilized such that the output frequency will be predictable.

Summary of the invention

It is an object of this invention to provide voltage inverter circuits having a stable frequency of operation.

It is another object of this invention to provide an improved frequency control for voltage inverter circuits.

Apparatus embodying the teachings of the present invention are characterized by a frequency controlling circuit connected in series with base electrodes of inverter transistors and base drive winding on a transformer connected to the base electrodes of the inverter transistors. Typically, such transformer is of a saturable core type. A linear output transformer is connected to the inverter transistors and through current feedback windings to the saturable core transformer.

The drawing

Description of the illustrative embodiment

Figure 1:
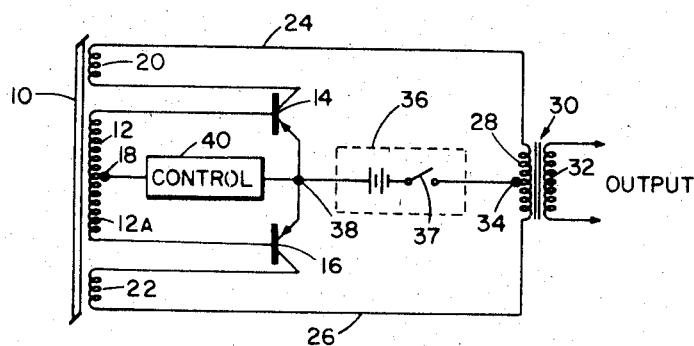
FIG. 1 is a schematic diagram of an inverter circuit utilizing the teachings of the present invention.

Referring now more particularly to the drawing, in the illustrated embodiments like numbers are used to denote like parts and structural features in the various figures. First, referring to FIG. 1, there is shown a voltage inverter circuit including saturable core 10 exhibiting rectangular hysteresis characteristics. On core 10 there is center tap winding 12 having opposite ends respectively connected to the control or base electrodes of transistor switches 14 and 16. The emitters or one of the primary electrodes of the two transistors 14 and 16 are commonly connected to center tap 18 of winding 12 through control 40. Regenerative current feedback windings 20 and 22 are respectively connected to the collector or other primary electrodes of transistors 14 and 16. The opposite ends of windings 20 and 22 are respectively connected over lines 24 and 26 to opposite ends of winding 28 of transformer 30. Transformer 30 serves as an output transformer and has output winding 32 wound thereon. It is preferred that transformer 30 is operated in a nonsaturating mode. Output winding 32 may be alternatively wound in an auto transformer connection with winding 28. Winding 28 is center tapped at 34 and connected to power supply means 36. Power supply means 36 may consist of a battery with a series switch 37, as shown, no limitation thereto intended. The other end of power supply means 36 is connected to the transistor 14 and 16 common connected emitters at junction 38.

The operation of the FIG. 1 circuit is first described without reference to frequency control 40 interposed between junction 38 and center tap 18. First, assume that transistor 14 is conducting current, therefore, transistor 16 will be nonconductive. As transistor 14 conducts current, saturable core 10 becomes magnetically saturated due to the action of windings 20 and 12. At maximum current conduction in transistor 14, transistor 16 is driven further into current nonconduction. However, when magnetic saturation is reached in saturable core 10, the base drive to transistor 14 is substantially reduced. Such action allows the magnetic field of core 10 to collapse inducing base drive voltage and current in winding portion 12A for driving transistor 16. This supply drive voltage is in turn amplified through transistor 16 to winding 22, which further drives core 10 toward opposite magnetic saturation. As such, the base drive to transistor 14 is further removed, switching it quickly toward current non-conduction. The circuit operation is thereby regenerative and quickly the current conduction switches from transistor 14 to transistor 16 and vice versa. In this manner the inverter circuit of FIG. 1 oscillates to provide an alternating voltage output in a square wave form through winding 32.

The voltage across the winding 12 between the center tap and either end is clamped to the emitter-base voltage $V_{BE}$ of the cnducting transistor, the nonconducting transistor having a reverse bias voltage imposed across its base-emitter junction by the induced voltage in winding 12. $V_{BE}$ therefore controls the magnetic switching behavior of core 10 through the clamping action above described. $V_{BE}$ of the conducting transistor therefore controls the frequency of the inverter circuit.

The effect on inverter frequency of $V_{BE}$ variations caused by changing load or temperature conditions can be reduced by inserting a voltage between center tap 18 and common emitter junction 38. The single frequency stabilizing control will affect both transistors 14 and 16 identically.

As stated, the voltage across the center tap winding 12 of transformer 10 is clamped to $V_{BE}$ of the conducting transistor. This clamping action yields an inverter frequency of:

$$f = V_{BE} 10^8 / 4 B_s A N$$

wherein $B_s A$ is the flux capacity of core 10 at saturation and N is the number of turns in each half of winding 12. By inserting a control voltage, $V_C$, by device 40, the equation for frequency of the device of the circuit becomes:

$$F = (V_{BE} + V_C) 10^8 / 4 B_s A N$$

If $V_C$ is large with respect to $V_{BE}$, then the $V_C$ will control the frequency of the circuit and thereby minimize the effect of $V_{BE}$ on frequency. A function of control 40 is to make $V_C$ large with respect to $V_{BE}$ or to make $V_C$ change such that it compensates for changes in $V_{BE}$.

Figure 2:
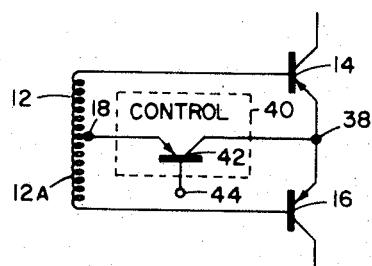
FIG. 2 is a frequency control circuit for use with the FIG. 1 embodiment.

Referring next to FIG. 2, there is a partial schematic diagram including the frequency control 40 shown connected to the center tap winding 12 and to transistors 14 and 16. In this embodiment, frequency control 40 consists of a single transistor 42 having an emitter electrode connected to the center tap 18 of winding 12 and its collector electrode connected to junction 38 of the common emitters of transistors 14 and 16. The base electrode of transistor 42 is brought out to a control terminal 44. When the transistor 42 is operated in its linear mode, the voltage drop thereacross can be large compared to the voltage drop between the emitters and base electrodes of transistors 14 and 16, respectively. Also, the dynamic impedance of transistor 42 and, therefore, $V_C$, may be varied by signal on terminal 44 for varying the frequency of the inverter circuit.

Figure 3:
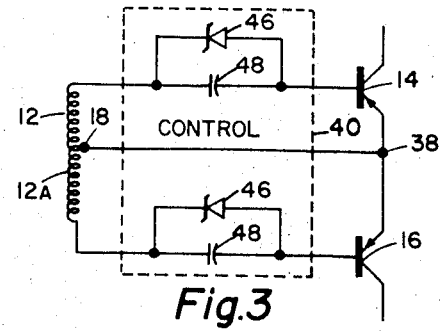
FIG. 3 is a second frequency control circuit having separate frequency control means for each transistor. Inverter circuits having transistors with common connected collectors require such individual control means.

In FIG. 3 there is shown a second embodiment for frequency control 40 consisting of a pair of Zener diodes 46 each with a capacitor 48 connected thereacross as shown. Each diode is in the base circuit of transistors 14 and 16. The reverse breakover voltage of the Zener diode, $V_Z$, opposes normal base current flow of the two inverter transistors and is substituted for the control voltage $V_C$. For example, with $V_Z$ equal to 9.1 volts, a 40-watt inverter using 2N3611 transistors operated from a 12-volt power supply means 36 exhibited frequency regulation of ±2% with a ±25% load variation. Common collector connections may be used as well as common emitter connections; in such cases the winding configuration of transformer 10 would be changed.

Care should be exercised in that the breakdown voltage from the emitter to the base of the non-conductive transistor not be exceeded. It is also preferred that transformer 30 does not magnetically saturate.

Figure 4:
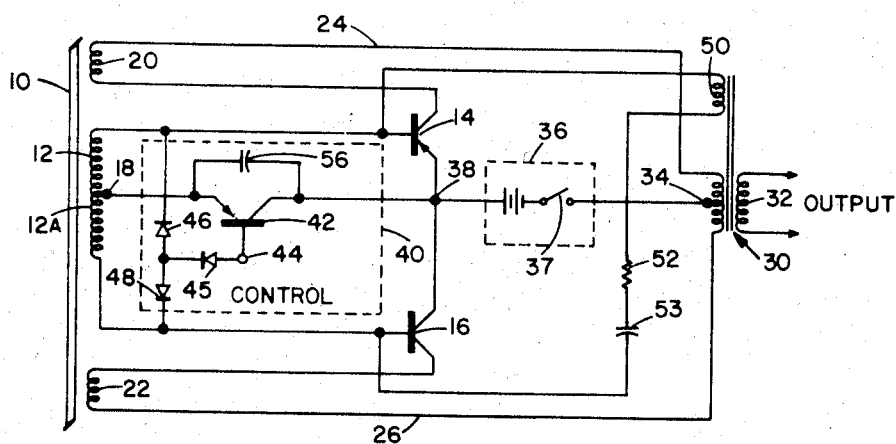
FIG. 4 is a schematic diagram illustrating a modification of the FIG. 2 frequency control as connected in a voltage inverter circuit.

Referring next to FIG. 4, there is shown a 400 Hertz 400-watt frequency regulated inverter utilizing the teachings of the present invention. This circuit has the same general configuration as that shown in FIG. 2 except for certain additional connections to the frequency control transistor 42. An additional feedback circuit is also provided by additional winding 50 on transformer 30 with series connected resistor 52 and capacitor 53 connected across the base electrodes of transistors 14 and 16, as shown. Such feedback provides capability of the inverter to drive a highly inductive load. When the transistors 14 and 16 are switching, the circuit 50, 52, and 53 provides an RC transient boost directly to the base electrode of the nonconducting transistor for causing it to conduct current.

In the frequency control 40, capacitor 56 is connected across transistor 42 to act as a filter. This arrangement keeps the voltage $V_C$ relatively constant. The voltage drop across transistor 42 is determined by the forward voltage drop of diodes 45, 46, and 48 and $V_{BE}$ of transistor 42.

It should be noted that the diodes 46 and 45, together with the emitter-base junction of transistor 42, are connected across the upper portion of center tap winding 12; while diodes 45 and 48 together with the emitter-base junction of transistor 42 are connected across the lower portion 12A of winding 12; thereby controlling the frequency of operation of the inverter by clamping the voltages across winding 12.

The negative temperature coefficients of diodes 44, 46 and 48 temperature compensate the negative temperature coefficient of the saturable core 10.

What is claimed is:

1. A DC to AC inverter circuit having first and second transformers respectively with first and second windings, each winding having a winding tap,
    first and second semiconductor switching means each having a control electrode respectively electrically connected to opposite ends of said first winding on said first transformer and having a pair of primary electrodes with one of each pair of said primary electrodes being electrically connected together,
    means electrically coupling other ones of said primary electrodes of said first and second semiconductor switching means respectively to said first transformer such that current flow from said other ones of said primary electrodes and said first winding in said first transformer causes a regenerative drive current to be supplied to one of said control electrodes and a turning off current drive to another of said control electrodes such that said semiconductor switching means are alternately current conductive and nonconductive,
    circuit means coupling opposite ends of said second winding on said second transformer to said first transformer and said other ones of said primary electrodes,
    the improvement including the combination,
    frequency stabilizing and control means respectively electrically interposed between said control electrodes to opposite ends of said first winding for completing a circuit between said control electrodes of said semiconductor switching devices, said first winding, and said one primary electrodes, and including a Zener diode poled to oppose current flow through said control electrodes in said semiconductor switching devices except for reverse voltages thereacross in excess of a Zener voltage, said frequency stabilizing and control means operative to determine the frequency of operation of the DC to AC inverter circuit.

2. The circuit of claim 1 further including a voltage integrating capacitor connected across said Zener diode.

3. A DC to AC inverter circuit having first and second transformers respectively with first and second windings, each winding having a winding tap,
    first and second semiconductor switching means each having a control electrode respectively electrically connected to opposite ends of said first winding on said first transformer and having a pair of primary electrodes with one of each pair of said primary electrodes being electrically connected together,
    means electrically coupling other ones of said primary electrodes of said first and second semiconductor switching means respectively to said first transformer such that current flow from said other ones of said primary electrodes and said first winding in said first transformer causes a regenerative drive current to be supplied to one of said control electrodes and a turning off current drive to another of said control electrodes such that semiconductor switching means are alternately current conductive and nonconductive,
    circuit means coupling opposite ends of said second winding on said second transformer to said first transformer and said other ones of said primary electrodes,
    the improvement including the combination,
    frequency stabilizing and control means electrically interposed between said one primary electrodes and said winding tap of said first winding and including a control transistor having first and second primary electrodes and a control electrode, one of said primary electrodes on said control transistor being electrically coupled to said winding tap of said first winding and another one of said primary electrodes of said control transistor connected to said one primary electrode of said semiconductor switching means, a base drive circuit connected to said control electrode of said control transistor and including a diode connected to said control electrode of said control transistor poled to conduct current in a direction to cause said control transistor to become current conductive, and circuit means connected across said first winding and to said diode such that said circuit means determines any voltage differentials between said primary electrode of said control transistor connected to said winding tap of said first winding and the opposite end of said first winding, and that such voltage differential determines the conductivity period of the respectively connected semiconductor switching means.

4. The circuit of claim 3 wherein said circuit means comprises two circuit diodes respectively connected to the first winding opposite ends and to said diode and poled to conduct current in the same direction as said diode.

5. The circuit of claim 4 wherein the first transformer has a magnetically saturable core.

6. A DC to AC inverter circuit having first and second transformers respectively with first and second windings, each winding having a winding tap, first and second semiconductor switching means each having a control electrode respectively electrically connected to opposite ends of said first winding on said first transformer and having a pair of primary electrodes with one of each pair of said primary electrodes being electrically connected together, means electrically coupling other ones of said primary electrodes of said first and second semiconductor switching means respectively to said first transformer such that current flow from said other ones of said primary electrodes and said first winding in said first transformer causes a regenerative drive current to be supplied to one of said control electrodes and a turning off current drive to another of said control electrodes such that said semiconductor switching means are alternately current conductive and nonconductive, circuit means coupling opposite ends of said second winding on said second transformer to said first transformer and said other ones of said primary electrodes, the improvement including the combination, frequency stabilizing and control means electrically interposed between said one primary electrode and said winding tap of said first winding, and further including circuit means connected across said first winding for clamping the voltage induced in said first winding to a predetermined magnitude such that the frequency of inverter circuit operation is controlled by such clamping voltage, and further including an electrically controlled impedance means connected to said one primary electrode for effectively electrically isolating any clamping action of said circuit means from said second transformer.

References Cited

UNITED STATES PATENTS

| | | | |
|---|---|---|---|
| 2,950,446 | 8/1960 | Humez et al. | 331—114 |
| 2,968,738 | 1/1961 | Pintell | 307—150 |
| 3,004,206 | 10/1961 | Sheffet | 321—2 |
| 3,117,270 | 1/1964 | Tailleur | 321—18 XR |
| 3,305,760 | 2/1967 | Davis et al. | 321—45 |
| 3,344,362 | 9/1967 | Lingle | 331—50 |

JOHN F. COUCH, *Primary Examiner.*

W. M. SHOOP, JR., *Assistant Examiner.*

U.S. Cl. X.R.

331—113